United States Patent [19]

Mashinsky

[11] Patent Number: 5,825,872
[45] Date of Patent: *Oct. 20, 1998

[54] PORTABLE AUTOMATED DIALER WITH TONE COMPLETION INDICATOR

[75] Inventor: Alex Mashinsky, New York, N.Y.

[73] Assignee: Anip, Inc., Carson City, Nev.

[*] Notice: The term of this patent shall not extend beyond the expiration date of Pat. No. 5,694,464.

[21] Appl. No.: 696,041

[22] Filed: Aug. 13, 1996

Related U.S. Application Data

[63] Continuation-in-part of Ser. No. 369,376, Jan. 6, 1995, Pat. No. 5,694,464.

[51] Int. Cl.6 .................................................. H04M 1/00
[52] U.S. Cl. ........................ 379/355; 379/220; 379/221; 379/354
[58] Field of Search ..................................... 379/355, 354, 379/356, 357, 396, 216, 67, 361, 88, 52

[56] References Cited

U.S. PATENT DOCUMENTS

| 4,197,526 | 4/1980 | Levine et al. | 340/311 |
|---|---|---|---|
| 4,266,098 | 5/1981 | Novak | 179/5.5 |
| 4,313,035 | 1/1982 | Jordan | 179/18 BE |
| 4,332,985 | 6/1982 | Samuel | 179/90 BD |
| 4,649,563 | 3/1987 | Riskin | 379/97 |
| 4,706,275 | 11/1987 | Kamil | 379/144 |
| 4,769,834 | 11/1988 | Billinger et al. | 379/207 |
| 4,817,135 | 3/1989 | Winebaum | 379/355 |
| 4,873,720 | 10/1989 | Son | 379/355 |
| 4,882,750 | 11/1989 | Henderson et al. | 379/355 |
| 4,980,910 | 12/1990 | Oba et al. | 379/355 |
| 5,045,833 | 9/1991 | Smith | 340/332 |
| 5,136,632 | 8/1992 | Bernard | 379/91 |
| 5,182,767 | 1/1993 | Bernard | 379/355 |
| 5,327,494 | 7/1994 | Gifford | 379/387 |
| 5,343,519 | 8/1994 | Feldman | 379/355 |
| 5,353,335 | 10/1994 | D'Urso et al. | 379/67 |
| 5,359,643 | 10/1994 | Gammino | 379/143 |
| 5,377,258 | 12/1994 | Bro | 379/88 |
| 5,388,148 | 2/1995 | Seiderman | 379/144 |
| 5,452,352 | 9/1995 | Talton | 379/355 |
| 5,455,857 | 10/1995 | McGuire | 379/355 |
| 5,694,464 | 12/1997 | Mashinsky | 379/354 |

Primary Examiner—Ahmad F. Matar
Assistant Examiner—Jacques M. Saint-Surin
Attorney, Agent, or Firm—Pennie & Edmonds LLP

[57] ABSTRACT

A portable automated dialer capable of generating a predetermined sequence of tones including DTMF tones into the microphone of a telephone. The automated dialer includes a signal generator for generating a series of tone signals, a speaker electrically connected to the signal generator for transmitting the tone signals as a series of audible tones and a tone completion indicator operating in at least a first and second state such that the tone completion indicator changes from the first state to the second state after the signal generator generates a last tone signal in the series of tone signals. The indicator may be a visual, auditory, tactile or even olfactory indicator.

10 Claims, 3 Drawing Sheets

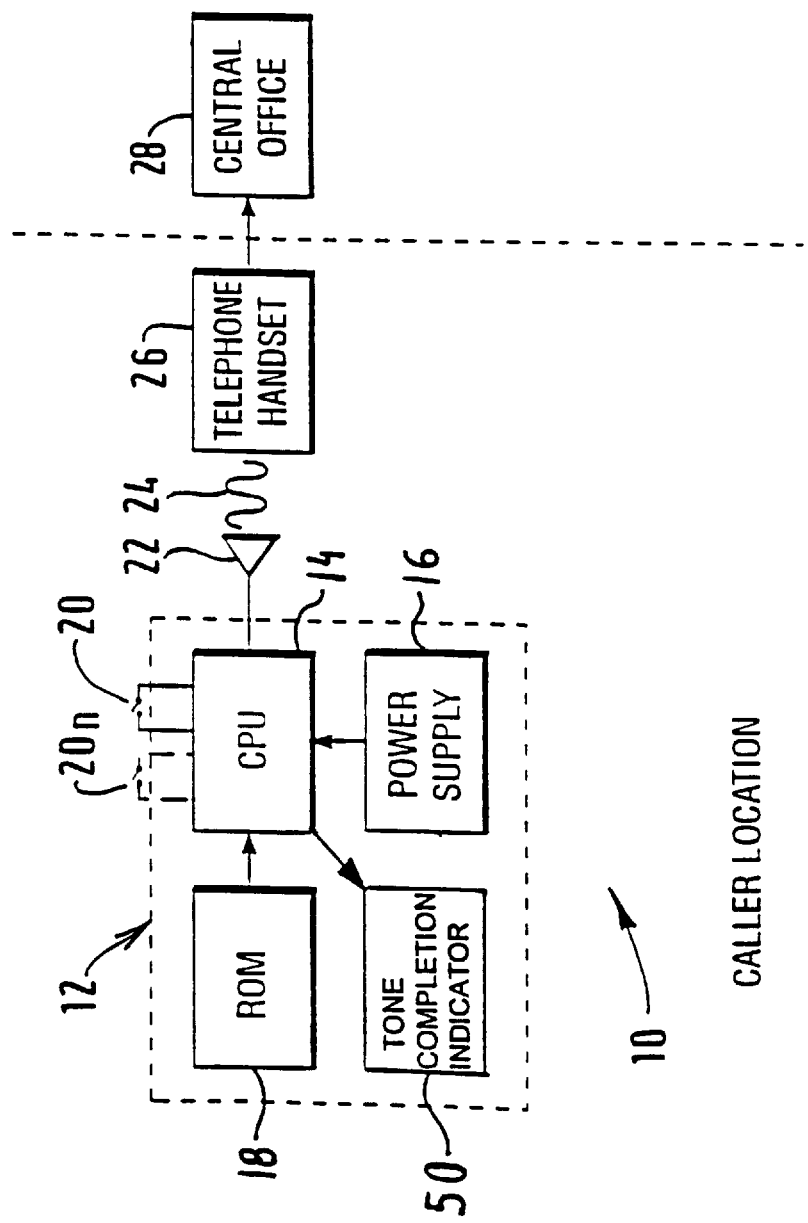

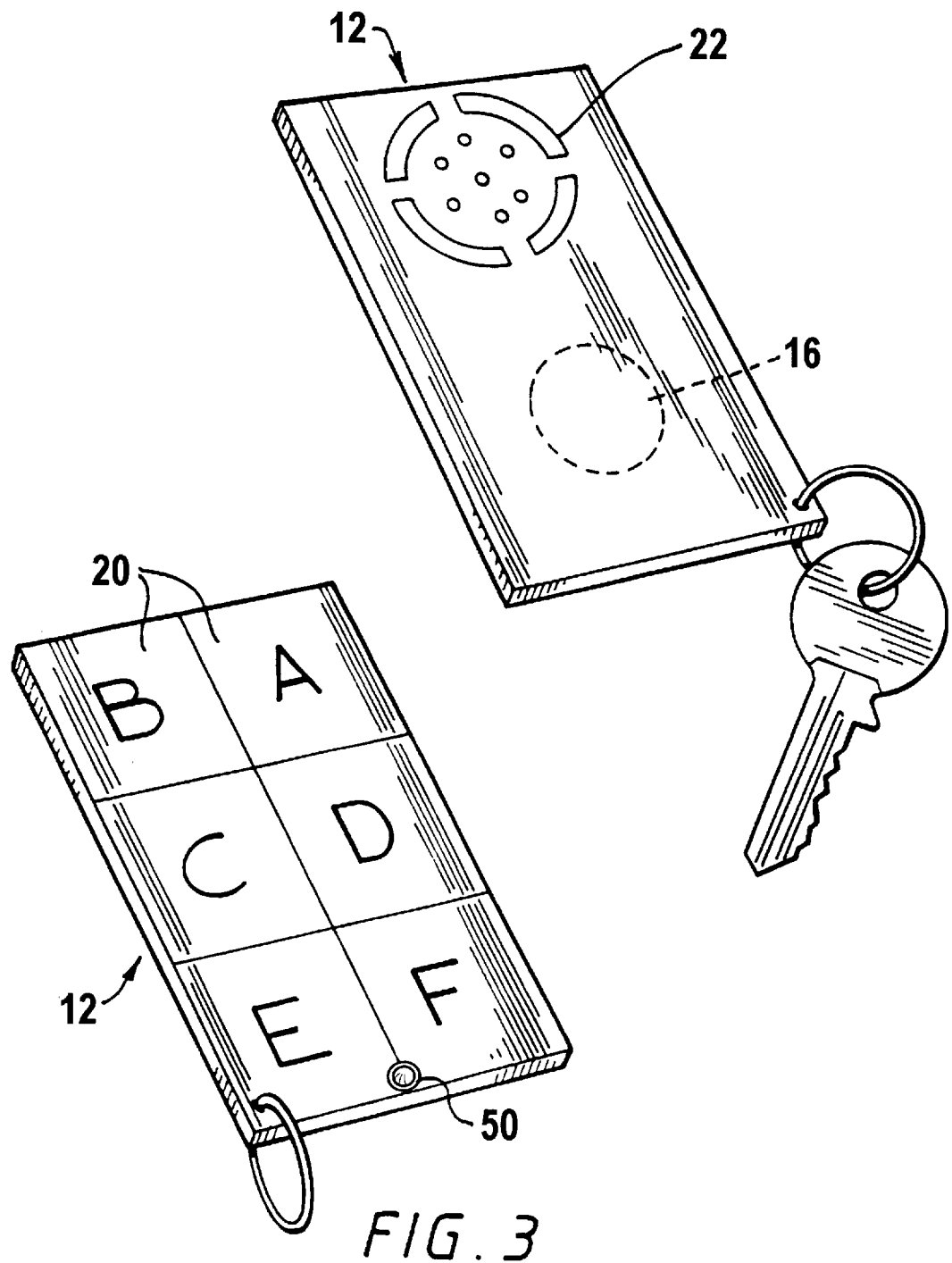

PORTABLE AUTOMATED DIALER WITH TONE COMPLETION INDICATOR

This application is a continuation-in-part of U.S. patent application Ser. No. 08/369,376 filed Jan. 6, 1995 now U.S. Pat. No. 5,694,464, entitled AUTOMATED ACCESS TELEPHONE SYSTEM.

BACKGROUND OF THE INVENTION

This invention relates generally to an automatic dialing device and more particularly to a portable automated dialer which includes an indicator for notifying the caller that the dialer has finished generating a sequence of tones.

A variety of telephone connectivity exists today, including normal calls to remote handsets, to pagers, to mobile or cellular units and others. All of these forms of calling rely on a caller knowing the destination telephone number of the called party, possibly an access number and/or a PIN (personal identification number). For a wide population, including, among others, children, the elderly and disabled people the caller either has difficulty dialing or has difficulty remembering the numbers or does not know where the called party is located. Many devices exist that address these concerns.

One such automated dialer addressing these concerns is disclosed in my copending U.S. patent application Ser. No. 08/369,376, filed Jan. 6, 1995, incorporated by reference herein. My copending application discloses a dialer which can be placed near a telephone microphone and which generates tones that are picked up by the telephone microphone to be employed in place of manually dialing a telephone number or access code. My Disclosure Document No. 371,922, also incorporated herein by reference, sets forth an improvement in which the dialer waits a predetermined length of time after dialing a service provider access code before dialing a PIN or destination number. Additional automated dialing devices are disclosed in U.S. Pat. Nos. 4,817,135 to Winebaum, 4,873,720 to Son, 4,882,750 to Henderson, et al., 4,980,910 to Oba et al., 5,182,767 to Bernard, 5,452,352 to Talton, 5,343,519 to Feldman, 5,455,857 to McGuire.

While each of these automated dialing devices performs a useful function, none of these devices indicates to the user when the device has finished generating a sequence of tones. This notification is an important feature since the caller may not be holding the receiver to his/her ear as is normally done when manually dialing a telephone and thus may not be aware that the dialer has finished. This notification that the device has completed at least a portion of its task can be especially important in noisy places where it is difficult to hear when the tones have stopped. It can also be very helpful for the hearing impaired who may not be able to hear when the tones have stopped. Further it can be helpful when a caller is distracted or not paying attention.

Thus there exists the need for a portable automated dialer which notifies the caller that it has finished generating a sequence of tones.

It is accordingly an object of the invention to provide a portable automated dialer which notifies the caller that the device has completed generating a sequence of tones.

SUMMARY OF THE INVENTION

The foregoing objects are attained by the present invention which provides a portable automated dialer capable of generating a predetermined sequence of tones including DTMF tones into the microphone of a telephone. The automated dialer includes a signal generator for generating a series of tone signals, a speaker electrically connected to the signal generator for transmitting the tone signals as a series of audible tones and a tone completion indicator operating in at least a first and second state such that the tone completion indicator changes from the first state to the second state after the signal generator generates a last tone signal in the series of tone signals. The indicator may be a visual, auditory, tactile or even olfactory indicator.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and accompanying drawings, in which:

FIG. 1 is a generalized block diagram illustrating the major components of the system in accordance with the present invention;

FIG. 2 is a diagrammatic view of a portable dialing unit in accordance with the present invention, illustrating a speaker for use in conjunction with a telephone microphone.

FIG. 3 is a diagrammatic view of a portable dialing unit in accordance with the present invention similar to FIG. 2, but showing the reverse side of the dialing unit to illustrating push button switches that can be used with the dialer and to illustrate one embodiment of a tone completion indicator;

DESCRIPTION OF ILLUSTRATED EMBODIMENTS

Figure 4:
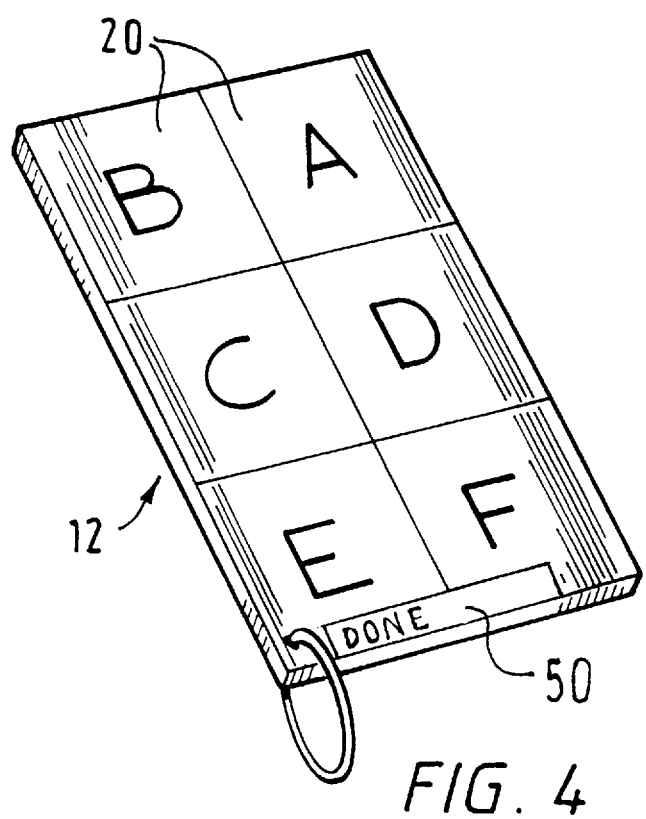
FIG. 4 is a diagrammatic view of a portable dialing unit in accordance with the present invention similar to FIG. 2, but showing the reverse side of the dialing unit to illustrating push button switches that can be used with the dialer and to illustrate another embodiment of a tone completion indicator.

The invention is directed to a portable automated dialer 12. The dialer 12 includes an indicator 50 to notify the caller that the dialer 12 has completed generating a sequence of tones (DTMF or otherwise). The indicator 50 will remove the uncertainty in the length of time the dialer needs to be held next to a telephone or when the caller needs to perform an additional function. Rather than waiting an uncertain amount of time to remove the dialer 12 from the telephone, (i.e. sometimes waiting to long and other times removing it prematurely), the caller will know the precise moment the dialer has completed its task or a predetermined portion of its task.

In the preferred embodiment, the portable automated dialer 12 includes a CPU (central processing unit) or microprocessor 14 powered by a power supply 16, typically a battery or solar power supply. The CPU 14 has associated therewith a storage and/or memory device 18, typically in the form of ROM and/or RAM, in which data is stored. As indicated in FIG. 1 the CPU 14 is connected to a sound producing device 22 which is used to generate a sequence of acoustic sounds, typically tones including but not limited to DTMF tones, corresponding to information stored in the ROM and/or RAM 18. At least one manual switch 20 is provided for selectively actuating the dialer 12. However as suggested by the phantom outline of the switch $20_n$, two or more such switches can be used in conjunction with the dialer as illustrated in FIG. 1. The same function can be achieved with a single switch on the dialer 12 that is sensitive to multiple actuations within a preset period of time or to dial different combinations of access and ID numbers. The CPU 14 is programmed to include a signal generator for converting the numbers stored in the ROM into tone signals and a speaker for transmitting these tone signals as audible DTMF tones upon actuation of the switch 20 for acoustically coupling the numbers stored in the dialer 12 to the microphone 26 of a telephone and for communicating this information to a central station 28. The microphone 26 of the telephone may either be located in the handset of the telephone or in another location if the telephone has speaker phone capabilities.

The CPU 14 also has associated therewith a tone completion indicator 50. This indicator 50 can be used to indicate a number of different situations to a caller. The CPU 14 provides a voltage or signal to the tone completion indicator 50 to actuate it for a period of time once the dialer 12 has completed generating a predetermined sequence of tones. If the dialer 12 is being used solely to dial a telephone number, the indicator 50 can indicate that the phone number has been dialed and the caller may remove the dialer 12 from the telephone. If a system is being employed wherein a number of different sequences of numbers needs to be dialed (i.e. calling card calls, access numbers etc.), the indicator 50 may indicate to the caller that the first, second or nth sequence of numbers has been completed and the caller either needs to perform some function to initiate another sequence of tones or it may indicate that the caller may remove the dialer 12 from the telephone. If the dialer 12 is of the type disclosed in my copending patent application Ser. No. 08/369,376, wherein the dialer 12 has the ability to dial a number of different sequences without further interaction from the caller, the indicator 50 may be used to indicate the status of the call (i.e. the first sequence of numbers has been dialed, etc.) or it may be used to indicate that all of the sequences have been completed or any combination thereof. While one embodiment of a dialer 12 has been described, it is considered within the scope of the invention that any conventional dialer could be equipped with the tone completion indicator 50.

In one embodiment, the tone completion indicator 50 may be an LED (light emitting diode) or any other sufficient illumination source. The LED will be mounted on the dialer 12 such that it will be visible to the caller while the dialer 12 is generating the tones. The CPU 14 sends a signal to the LED or to the logic circuit that controls the LED to change the state of the LED when the dialer 12 finishes generating a predetermined sequence of tones (DTMF or others). This state change may be from on to off, or from off to on, or it may flash on and off in a predetermined or random pattern. This visual indication will be particularly useful for the hearing impaired, the inattentive caller or in noisy locations.

In another embodiment, the tone completion indicator 50 may be a vibrator. The CPU 14 sends a signal to the vibrator which causes the vibrator to turn on (to vibrate) for a predetermined period of time when the dialer 12 finishes generating a predetermined sequence of tones, thus causing the dialer 12 to vibrate for a predetermined period of time. This type of indicator will be particularly helpful for the visually impaired, the hearing impaired, the inattentive caller or in noisy locations.

In yet another embodiment, the tone completion indicator 50 may be an auditory indicator such as a specific tone or a digitally recorded word or phrase (i.e. done, OK or some other message) that is generated or played by the dialer after the last tone is generated. This auditory indicator may utilize the speaker 22 although it may employ a separate speaker (not shown). In the event that the speaker 22 is utilized, there may be a pause before the indicator tone is transmitted or there may be a change from tone to voice or a change from DTMF tones to a non-DTMF tone. In the event that a separate speaker is employed, the speaker will simply be activated after the signal generator generates the last signal in the series.

In another embodiment, the tone completion indicator 50 may employ a conventional display screen. The display screen will be mounted on the dialer 12 such that it will be visible to the caller while the dialer 12 is generating the tones. Either a message could be displayed such as done, or OK or any other sufficient message, or if the display is an illuminated display it could operate in the same manner as the LED described above.

It will be apparent to one skilled in the art that any combination of the above indicators 50 could be employed in a single dialer 12. It will also be apparent to one skilled in the art that the indicator 50 may be a visual, auditory, tactile or even olfactory indicator.

It will thus be seen that the invention efficiently attains the objects set forth above, among those made apparent from the preceding description. In particular, the invention provides a portable automated dialer 12 including a tone completion indicator 50 to notify the caller that the dialer 12 has completed generating a sequence of tones.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. Automated access system for use with a central station of a telephone network, comprising:
 a control station having a pre-determined access telephone number;
 a portable dialer for transmitting acoustic signals through the handset of a caller telephone station connected to said central station,
 said signals including a first series of signals for dialing said pre-determined access telephone number to route and connect a call to said control station,
 said signals including a second series of signals which represent a dialer ID number and which are transmitted through said handset and through said central station to said control station,
 said second series of signals being transmitted after said call is connected to said control station;
 said portable dialer comprising a tone completion indicator operating in at least a first and second state such that said tone completion indicator changes from said first state to said second state after said portable dialer transmits a last signal of at least one of said first and second series of signals;
 said control station including a CPU associated with a router and a programmed database which includes instructions associated with dialer ID numbers;

said control station being configured to receive said second series of signals and in response thereto to route the call to provide a specified service as a function of the instructions associated with the dialer ID number represented by said second series of signals received from said portable dialer, wherein said control station detects an ANI of the calling telephone station and thereafter terminates said call, and wherein said instructions direct the control station to place a second call to a second telephone station having a predetermined telephone number to detect if the second call is answered, and if it is, to place a third call based upon the ANI of the calling telephone station to connect the second telephone station with the calling telephone station.

2. The system of claim 1 wherein the portable dialer comprises at least one switch, the first series of signals and the second series of signals being transmitted in response to a single actuation of the switch.

3. The system of claim 1 wherein the tone completion indicator comprises an illuminator, the illuminator changing from a first state to a second state after transmission of the last tone of at least one of the first and second series of signals.

4. The system of claim 1 wherein the tone completion indicator comprises a vibrator, the vibrator changing from a first state to a second state after transmission of the last tone of at least one of the first and second series of signals.

5. The system of claim 1 wherein the tone completion indicator comprises an audible signal generator, the audible signal generator changing from a first state to a second state after transmission of the last tone of at least one of the first and second series of signals.

6. The system of claim 5 wherein the audible signal generator generates a voice message.

7. The system of claim 5 wherein the audible signal generator generates a tone.

8. The system of claim 1 wherein the portable dialer further comprises a display screen for displaying messages relating to at least one of the first and second series of signals.

9. The system of claim 8 wherein the tone completion indicator generates a message for display on the display screen, the message indicating that a last signal of at least one of the first and second series of signals has been transmitted.

10. The system of claim 1 wherein the tone completion indicator comprises an olfactory indicator, the olfactory indicator changing from a first state to a second state after transmission of the last tone of at least one of the first and second series of signals.

* * * * *